United States Patent [19]
Vossen et al.

[11] Patent Number: 5,446,664
[45] Date of Patent: Aug. 29, 1995

[54] METHOD AND APPARATUS FOR DIAGNOSING FAULTY CYLINDERS IN INTERNAL COMBUSTION ENGINES

[75] Inventors: David L. Vossen; James T. Walters, both of Kalamazoo, Mich.

[73] Assignee: SPX Corporation, Muskegon, Mich.

[21] Appl. No.: 391,628

[22] Filed: Feb. 21, 1995

Related U.S. Application Data

[63] Continuation of Ser. No. 957,667, Oct. 7, 1992, abandoned.

[51] Int. Cl.⁶ ............................................. G01P 3/56
[52] U.S. Cl. ........................ 364/431.03; 364/431.04; 364/431.01; 73/117.3
[58] Field of Search ............... 364/431.03, 431.04, 364/431.05, 431.07, 431.08, 431.01; 73/116, 117.3; 123/419, 436, 691

[56] References Cited

U.S. PATENT DOCUMENTS

| | | | |
|---|---|---|---|
| 4,520,449 | 5/1985 | Johnson et al. | 364/559 |
| 4,539,841 | 9/1985 | Schroeder et al. | 73/116 |
| 4,562,818 | 1/1986 | Kohama et al. | 123/478 |
| 4,691,286 | 9/1987 | Obayashi et al. | 364/431.04 |
| 4,697,561 | 10/1987 | Citron | 123/339 |
| 4,843,870 | 7/1989 | Citron et al. | 73/116 |
| 4,932,379 | 6/1990 | Tang et al. | 123/436 |
| 5,041,980 | 8/1991 | Maddock et al. | 364/431.03 |
| 5,056,360 | 10/1991 | Dosdall et al. | 73/116 |
| 5,086,741 | 2/1992 | Nakamura et al. | 123/419 |
| 5,088,318 | 2/1992 | Osawa | 73/117.3 |
| 5,093,793 | 3/1992 | Suzuki | 364/431.03 |
| 5,132,909 | 7/1992 | Schroeder et al. | 364/431.03 |
| 5,200,899 | 4/1993 | Ribbens et al. | 364/431.08 |
| 5,237,504 | 8/1993 | Holmes et al. | 364/431.08 |
| 5,239,473 | 8/1993 | Ribbens et al. | 364/431.08 |
| 5,241,480 | 8/1993 | Takaku et al. | 364/431.08 |
| 5,245,866 | 9/1993 | Hashiguchi et al. | 73/117.3 |
| 5,263,364 | 11/1993 | Nakayama et al. | 73/116 |
| 5,263,365 | 11/1993 | Müller et al. | 73/117.3 |
| 5,268,843 | 12/1993 | Imai | 364/431.08 |
| 5,278,760 | 1/1994 | Ribbens et al. | 364/424.1 |
| 5,303,158 | 4/1994 | Kuroda | 364/431.08 |

OTHER PUBLICATIONS

Rizzoni and Connolly Real Time Estimation Of Engine Torque For The Detection Of Engine Misfires.

Primary Examiner—Kevin J. Teska
Assistant Examiner—Russell W. Frejd
Attorney, Agent, or Firm—Clifford Kraft

[57] ABSTRACT

This invention relates to a method and apparatus for diagnosing faulty cylinders in internal combustion engines. A probe produces a signal that is representative of the instantaneous angular velocity of the engine shaft. A Percent Power Contribution (PPC) parameter is computed by substracting the square of the instantaneous angular velocity at the beginning of a cylinder period from the square of the instantaneous angular velocity at the end of that cylinder's period and dividing this difference by the square of the average engine angular velocity. A value of this PPC parameter significantly less than zero indicates a faulty cylinder. An Average Energy Percent parameter (AEP) is computed by dividing the squares of the sampled instantaneous angular velocity values summed over a cylinder period by the number of samples in that period and by the square of the average engine angular velocity. A value of this AEP parameter significantly less than one indicates the previous cylinder in the firing order is faulty. The two parameters can be used independently or in combination to diagnose continuous and transient engine faults. Faulty cylinder indications are displayed on a monitor or communicated to an operator.

6 Claims, 6 Drawing Sheets

METHOD AND APPARATUS FOR DIAGNOSING FAULTY CYLINDERS IN INTERNAL COMBUSTION ENGINES

This is a continuation of application Ser. No. 08/957,667, filed Oct. 7, 1992, now abandoned.

BACKGROUND OF THE INVENTION

1. Field of the Invention

This invention relates generally to the field of automotive engine diagnostics and more particularly concerns the problem of finding one or more intermittently faulty engine cylinders.

2. Description of the Prior Art

It is well known that the instantaneous angular velocity of an internal combustion engine at a fixed throttle setting varies over a small range as each cylinder fires. For an engine with all good cylinders, this variation resembles a sinusoidal function superimposed on a constant angular velocity. The pattern changes when one or more cylinders is not supplying its full power contribution. Even though this waveform is indicative of the overall performance of an engine; alone, it is not very useful for determining which cylinder is faulty, especially when there is more than one bad cylinder.

Prior art methods have made various attempts to use this angular velocity waveform to determine the condition of a cylinder. Some methods arrive at an average or statistical evaluation of a given cylinder based on low resolution angular velocity estimates averaged over many engine cycles to lead to conclusions about each cylinder's performance. There are two major disadvantages with these methods. 1) Transient phenomena such as single mis-fires or conditions that occur only rarely cannot be detected. 2) The engine cannot be tested during acceleration or changing load where the most demands are placed on it for performance.

Other methods have computed acceleration or have compared relative power against stored parameters for good engines. Acceleration methods suffer from numerical noise problems because estimating a mathematical derivative is a numerically noisy process. Comparing parameters against those of good engines requires large data bases of data for different engine types.

Schroeder and Ryan in U.S. Pat. No. 4,539,841 discuss determining peak cylinder pressure and relative power output of each cylinder from a good engine at idle speed, as well as a total load torque and total engine inertia. These good engine parameters are stored and used for comparison during diagnostics. A diagnostic uses the difference in the squares of the instantaneous RPM values at three points during the cylinder firing cycle to derive a cylinder net power output. These numbers are displayed on a CRT screen for human interpretation. The method is cumbersome in that it requires pre-stored values of several parameters such as engine inertia and engine frictional torque from a good engine in order to derive net power output. The method presented by Schroeder and Ryan is primarily suited to a four cylinder engine. The technique becomes more and more difficult to use as the number of cylinders increases because of the overlap between compression and power phases of various cylinders.

Schroeder et at. in U.S. Pat. No. 5,132,909 address a method where a very low resolution velocity estimate of six samples per engine revolution are used. Only gross statistical averages of engine speeds can be obtained. These estimates are used to derive average quantities called relative compression and relative power output for a given cylinder. While this method can possibly locate continuous or long term problems, it will entirely miss any cylinder condition that occurs intermittently or infrequently.

Obayashi et at. in U.S. Pat. No. 4,691,286 teach a closed-loop method that also uses a very low resolution angular velocity estimate (twelve samples per revolution). While different from that of Schroeder, it is still highly statistical in nature and yields only average quantities. It consists of taking the difference in the squares of velocity at two different points in the engine cycle. This quantity is then statistically analyzed over one hundred engine cycles to determine the standard deviation of performance. The standard deviation is then used in a closed loop to control the fuel-air ratio or other operating parameters. The method cannot detect transient problems or problems that only occur under certain engine loading or acceleration conditions. It is aimed at the performance and control of the entire engine, not the diagnosis of one cylinder.

Rizzoni and Connolly in their paper, "Real Time Estimation of Engine Torque for the Detection of Engine Misfires," presented at the 1991 ASME Winter Meeting, Atlanta Ga., teach a method of deconvolution from high resolution angular velocity data to torque values for each cylinder in the spatial frequency domain. Computations are performed on the 1/N th harmonic of the major rotational spatial frequency. An estimate is made of the root-mean-square of the indicated torque output of an individual cylinder. Identification of mis-fire is accomplished using statistical detection methods such as a likelihood ratio test on a non-uniformity metric. Again, the method is statistical and would miss a single event. Also, it is very compute intensive since it uses the Fast Fourier Transform and several statistical detection integrals. This makes it difficult to incorporate into a piece of standard diagnostic test equipment.

The present invention overcomes the problems caused by statistical computation and low resolution sampling, as well as computation of acceleration and comparison against stored parameters of good engines. Two numerical quality parameters are computed for each cylinder during every firing cycle. The sequence of these numbers can be stored and used to detect single mis-fires and other transient events. The method is equally applicable to engines with from two to twelve cylinders.

SUMMARY OF THE INVENTION

The present invention comprises a probe that produces an electrical signal that is representative of the instantaneous angular velocity of the engine, a means of taking the square of the instantaneous angular velocity at the beginning and end of a cylinder period, a means of finding the average engine angular velocity, and a means of dividing the difference between the square of the instantaneous angular velocity at the end of a cylinder period and the square of the instantaneous angular velocity at the beginning of the cylinder period by the square of the average engine angular velocity. This computation produces a Percent Power Contribution (PPC) parameter that can be compared against a threshold to determine if the cylinder in question is good or faulty. A good cylinder produces a positive PPC parameter. A negative PPC parameter indicates a faulty cylinder firing event. The PPC parameter is an instantaneous value that can detect transient problems. The invention displays for an operator, records or communicates any determination of a bad cylinder.

The present invention also comprises a means for computing an Average Energy Percent (AEP) parameter by dividing the average energy contribution during a cylinder period by the square of the average engine angular velocity for a cylinder cycle. This AEP parameter can be compared against a threshold to determine if the previous cylinder in the firing order is faulty or good. A good cylinder produces an AEP parameter near one, while a bad cylinder produces an AEP parameter significantly less than one for the next cylinder in the firing sequence.

The two parameters can be used independently or in combination to diagnose an engine. When used in combination, the AEP parameter acts as a check on the PPC parameter. Generally, a faulty cylinder will have a PPC parameter considerably less than zero, and the AEP parameter for the next cylinder in the firing order will be considerably less than one (but still positive). A transient fault may affect one or both parameters. The use of two independent parameters leads to increased sensitivity to isolated events such as mis-fires.

BRIEF DESCRIPTION OF THE DRAWINGS

For a more complete understanding of this invention, reference should now be made to the embodiments illustrated in greater detail in the accompanying drawings and described below by way of examples of the invention.

It should be understood that the invention is not necessarily limited to the particular embodiments illustrated herein but could be constructed in a variety of ways by one skilled in the art including, but not limited to, the use of analog or digital circuitry, programmable logic devices, microprocessors, or digital signal processors.

DESCRIPTION OF PREFERRED EMBODIMENTS

Figure 1:
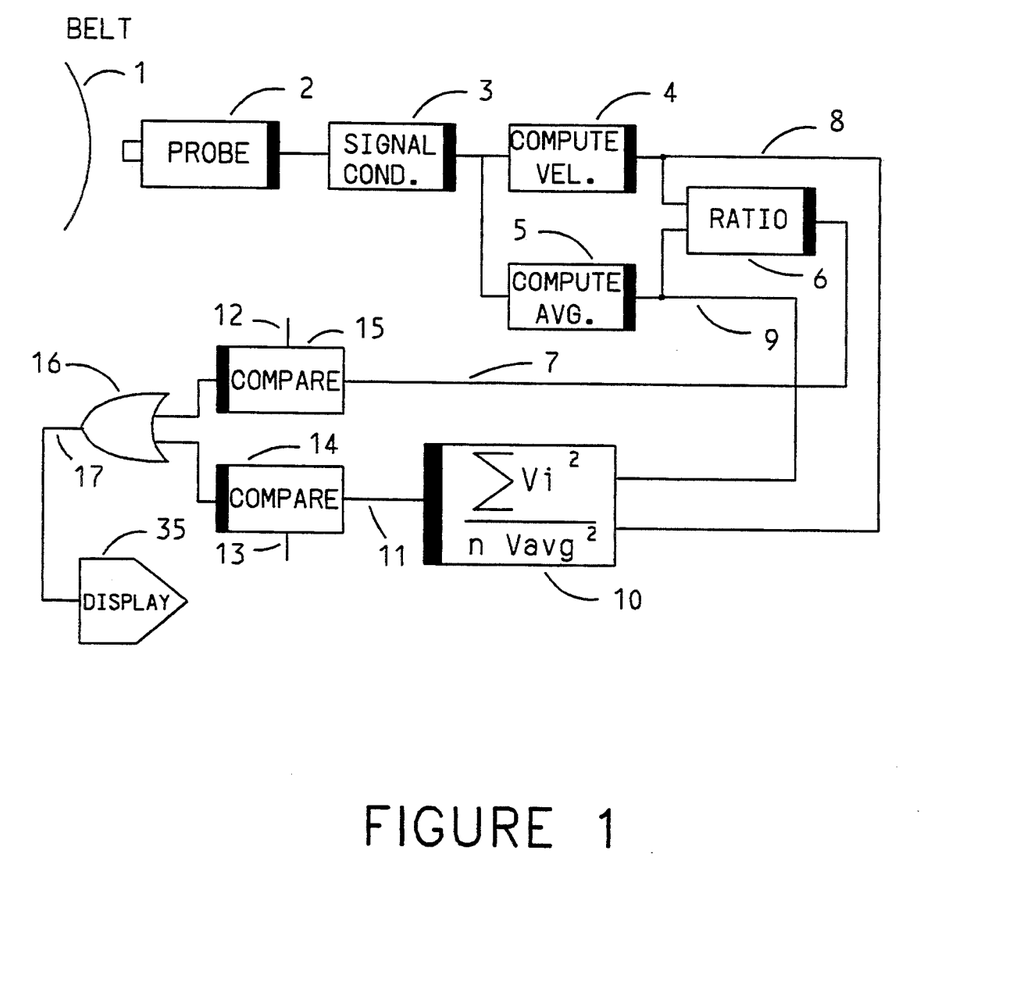
FIG. 1 is an overall block diagram of the apparatus comprising the invention.

Turning first to FIG. 1, it can be seen that the present invention contains a probe 2 that is capable of measuring the instantaneous velocity of an engine's crankshaft via a belt I or pulley that rotates at some angular velocity proportional to that of the crankshaft. This probe can be a magnetic pickup, a light beam, a rotating wheel directly in contact with the belt, pulley, or shaft, or any other means capable of measuring the engine shaft's angular velocity. The probe 2 produces a signal that is directly related to the instantaneous angular velocity of the crankshaft. This signal is conditioned by a signal conditioning means 3 for further processing. This signal conditioning means may simply measure or shift the level and/or frequency of the signal, or it may comprise an analog to digital (A/D) converter that changes the format of the signal to that of a sequence of numerical values suitable for processing by a microprocessor or digital signal processor (DSP). It may be a device that converts optical signals to electrical signals.

The conditioned signal is routed from the signal conditioning means 3 to a means 4 for computing the instantaneous angular velocity or RPM of the crankshaft and to a means 5 for computing the average angular velocity or RPM of the engine. In an analog version of the invention, the means for computing the instantaneous angular velocity $V_i$ at the ith point of time in the cylinder firing cycle may be a voltage measuring device. In a digital or microprocessor version of the invention, the means for computing the instantaneous angular velocity may be a digital storage operation of the ith output word from a pulse width measurement or analog to digital (A/D) converter. In any construction of the invention, the output from the means 4 for computing the instantaneous angular velocity is a continuous or discrete sequence of angular velocity values representing a continuous variable $V(t)$. In particular, there is a value of this variable at the beginning of a cylinder firing period $V(t_{start})$ which will henceforth be named $V_{start}$ and a value of this variable at the end of that cylinder firing period $V(t_{end})$ which will henceforth be named $V_{end}$.

The computation means 5 for computing the average angular velocity also receives the conditioned signal representing the instantaneous angular velocity of the crankshaft from the signal conditioning means 3. The average angular velocity $V_{avg}$ is computed in the continuous case by integrating $V(t)$ over a period of time and dividing the resulting integral by the that length of time. In the discrete or digital case, the average angular velocity is computed by summing a certain number of instantaneous angular velocities samples $V_i$ and dividing the resulting sum by the number of samples summed. The computation means 5 can be, but does not have to be, a series of steps in a microprocessor of digital signal processor (DSP) program. It could also be an analog or digital integrator circuit or summing circuit.

The two values of instantaneous angular velocity $V_{start}$ and $V_{end}$ as well as the average angular velocity of the engine $V_{avg}$ are routed to a computation means 6 for computing a Percent Power Contribution (PPC) parameter. This computation means 6 comprises a squarer for taking the square of a number, or the square of a voltage level in an analog embodiment, a subtracter to algebraically subtract two numbers or voltages values, and a divider to divide two numbers or voltage values. The output of the PPC computation means 6 can be represented by the formula:

$$PPC = \frac{V_{end}^2 - V_{start}^2}{V_{avg}^2}$$

The computation means 6 can be, but does not have to be, a series of steps in a microprocessor or DSP program. It can also be accomplished by discrete squarers, subtracters, and a divider.

The PPC parameter 7 thus computed is an excellent indicator of the performance of the cylinder in question. It will become less than zero for any cylinder that does not supply positive energy during its firing cycle. The PPC parameter 7 is responsive to a fault that occurs either intermittently or continuously. The PPC parameter 7 may be represented as a voltage in an analog system or a number in a digital or microprocessor system.

The PPC parameter 7 is routed to a comparing means 15 that compares it against a threshold 12 that is near zero. If the PPC parameter is less than the threshold, the cylinder can be flagged with a fault condition and the fault condition can be displayed by a display device 35 such as a digital monitor. The comparing means 15 can be an analog comparator, a digital comparator or a comparison operation in a microprocessor or DSP.

The instantaneous angular velocity values V(t) or $V_i$ and the average angular velocity $V_{avg}$ are also routed to a computing means 10 for computing an Average Energy Percent (AEP) parameter 11. For an analog version of the invention, an energy value for the cylinder is computed by integrating the square of the instantaneous angular velocity V(t) over the cylinder's firing cycle and dividing by the time period of the cycle. In the discrete or digital version of the invention, the squares of the sampled instantaneous angular velocity values $V^2_i$ are summed over the cylinder cycle and divided by the number of samples in the cylinder cycle. This energy value is then divided by the square of the average angular velocity over the cylinder cycle $V_{avg}^2$ to arrive at the AEP parameter. The means 10 for computing the AEP paramenter comprises a squarer for squaring voltage values or numbers, an integrator for integrating voltages, or an adder for summing numbers, and a divider for dividing voltage values or numbers. The output of the AEP computation is represented by the formula:

$$AEP = \frac{\sum\limits_{i}^{n} V_i^2}{nV_{avg}^2}$$

The computation means 10 can be, but does not have to be, accomplished by a series of steps in a microprocessor or DSP program. It can also be accomplished by a discrete squarer, summer and divider.

The AEP parameter 11 is near one for the next cylinder in the firing order for a cylinder that is contributing significantly to the power output of the engine. A faulty cylinder or mis-fire causes the AEP value of the next cylinder in the firing order to drop to considerably less than one. The AEP parameter 11 may be represented as a voltage in an analog system or a number in a digital system. The reason the AEP parameter appears to fall below one for the next cylinder in the firing sequence after the bad cylinder rather than for the bad cylinder itself is became of engine inertia.

The AEP parameter 11 is routed to a second comparing means 14 where it is compared against a threshold 13 near one. If the AEP 11 parameter is less than the threshold 13, the cylinder is faulty or has suffered a transient condition that caused its energy output to temporarily drop. The comparing means 14 can be an analog comparator, digital comparator or a comparison operation in a microprocessor.

The fault indications of the PPC comparing means 15 and the AEP comparing means 14 can be combined logically as shown with an OR gate 16 in FIG. 1 to produce a composite fault indicator 17, or they can be analyzed and re, cored separately. Any faulty cylinder indications can be displayed on a display device 35 such as a digital monitor, CRT or television screen, primer, or they can be recorded or communicated to an engine analyzer system or operator.

Figure 2:
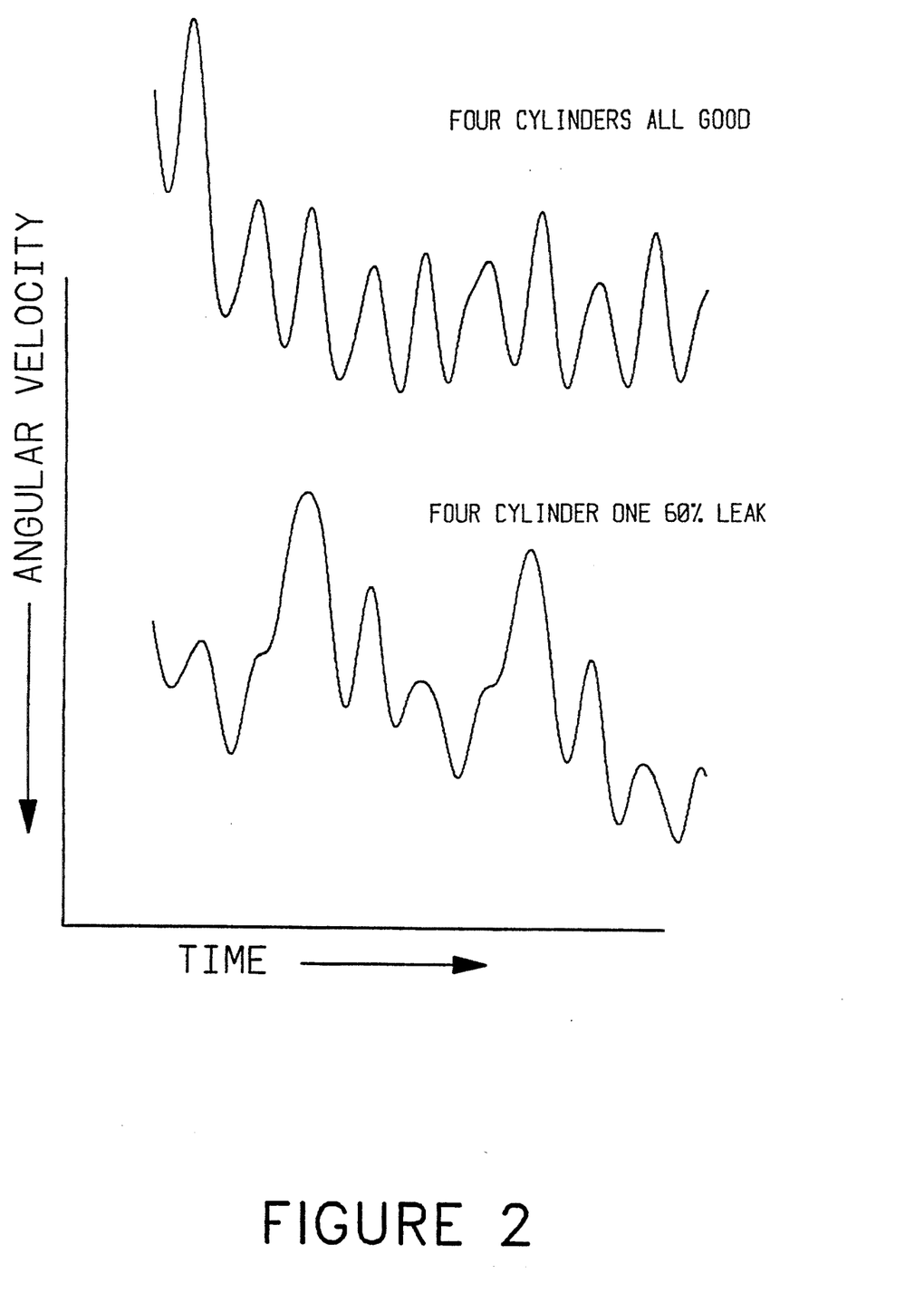
FIG. 2 is a graph showing the typical instantaneous angular velocity of a four cylinder internal combustion engine, both for all cylinders good and for the case where one cylinder has a 60% pressure leak.

FIG. 2 depicts the behavior of the instantaneous angular velocity for a good cylinder and one possible case of a bad cylinder. It can be seen that the instantaneous angular velocity of a good engine follows roughly a sinusoidal waveform. Increases in angular velocity occur when a cylinder fires, and decreases occur when friction or engine loading slows the engine back down. It can also be seen that when a cylinder mis-fires or is faulty, the pattern deviates considerably from that of a sinusoid. Previous attempts to analyze the instantaneous angular velocity functions shown in FIG. 2 have proved unreliable. This is because, while the pattern indicates a fault, it does not indicate directly which cylinder is faulty. This effect is particularly acute when more than one cylinder is bad. This has led to the need for the PPC and AEP parameters of the present invention as described above.

Figure 3:
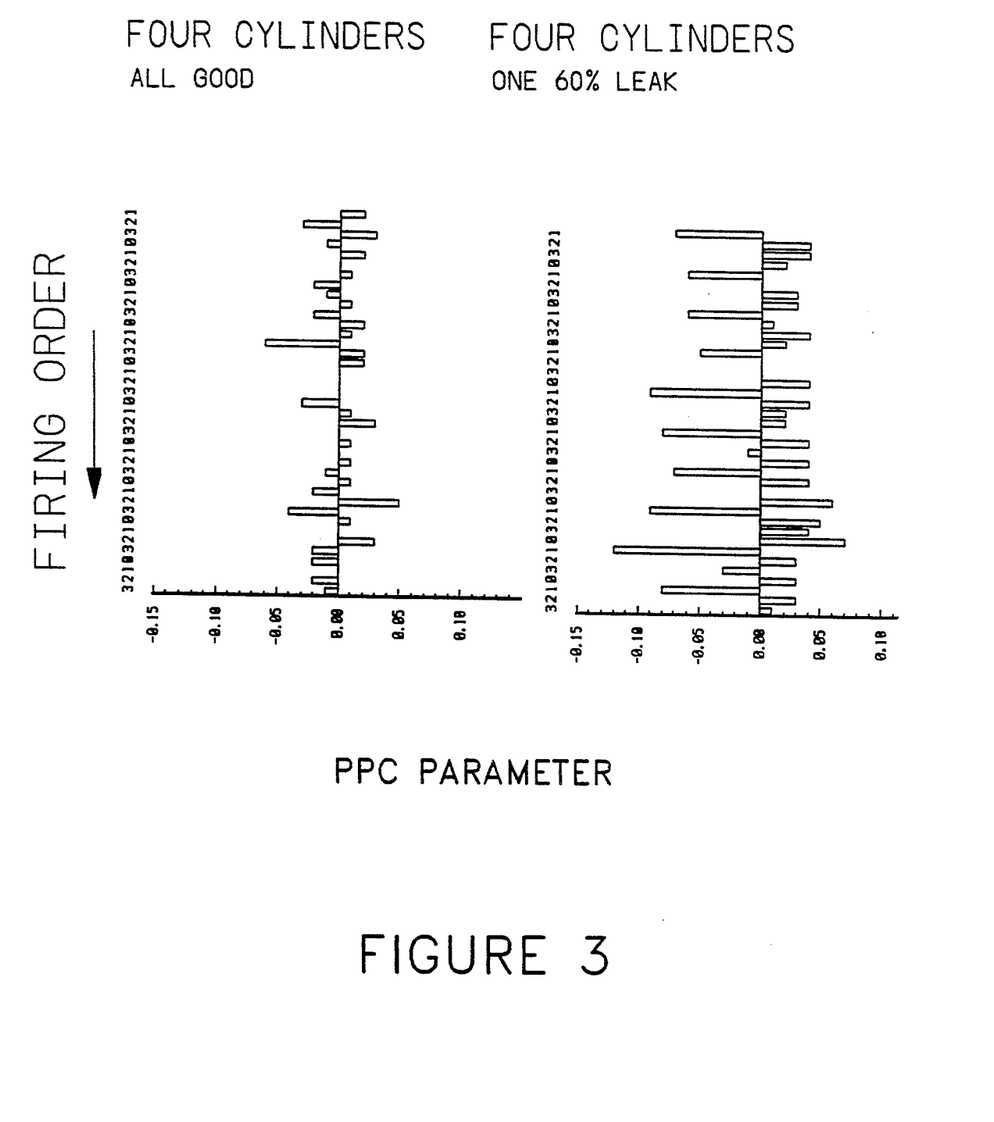
FIG. 3 is graph showing the behavior of the PPC parameter for a good four cylinder engine and one with one bad cylinder that has a 60% pressure leak.

Referring now to FIG. 3, it is seen that for a good cylinder the PPC parameter is very near zero. There are occasional small negative deviations, but they are random, and do not attach to a particular cylinder. For a faulty cylinder with a 60% pressure leak, the PPC parameter can be seen to be quite negative. However, the PPC parameter can detect faults much less severe than a 60% pressure leak.

Figure 4:
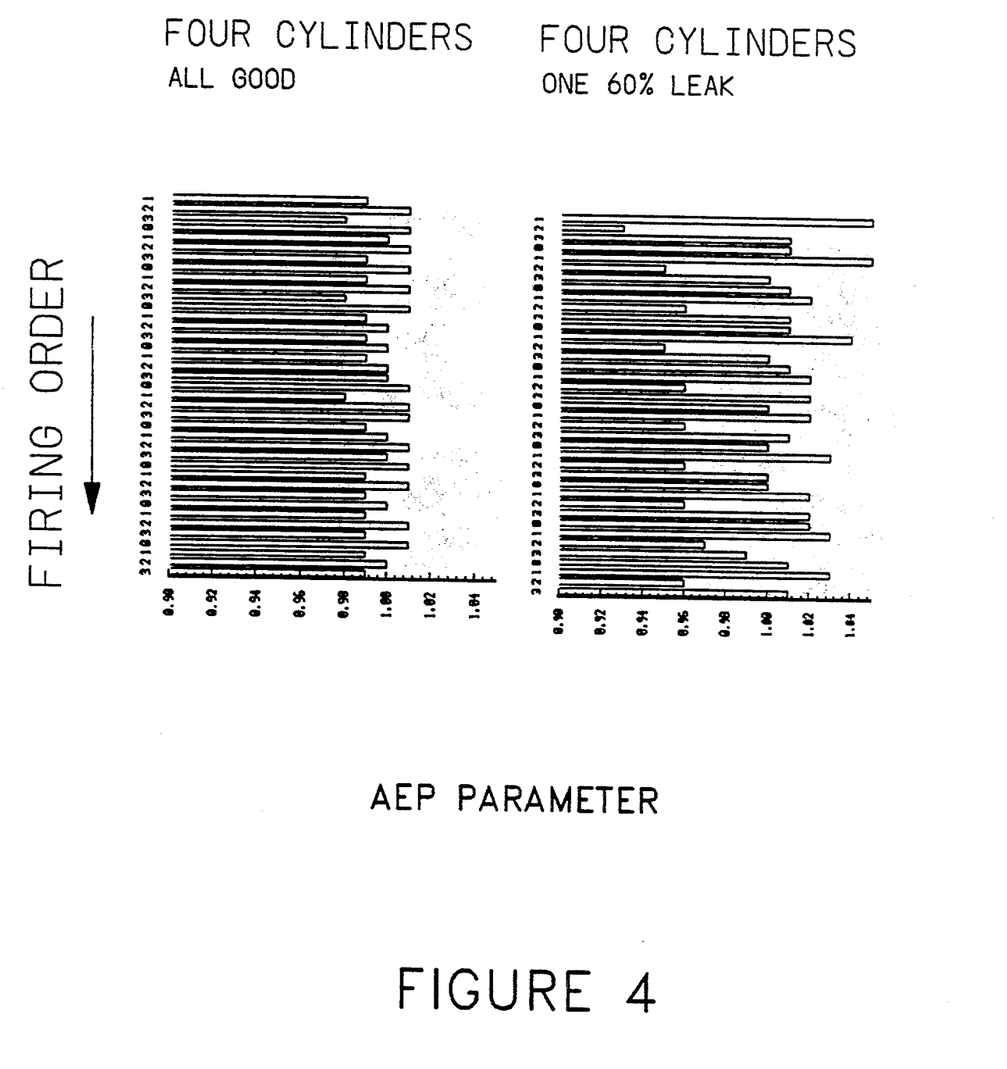
FIG. 4 is a graph showing the behavior of the AEP parameter for a good four cylinder engine and one with one bad cylinder that has a 60% pressure leak.

Referring to FIG. 4, it is seen that for a good cylinder, the AEP parameter is near one, but for a bad cylinder, the AEP parameter is considerably less than one for the next cylinder in the firing order. The AEP parameter shown in FIG. 4 can be used as a check on the PPC parameter shown in FIG. 3. If there is a single bad cylinder, or transient event in a cylinder, its PPC parameter will take a significant negative deviation followed by a substantial drop in the AEP parameter for the next cylinder in the firing sequence. The drop in the AEP parameter appears to occur for the next sequential cylinder firing sequence because of a time delay in the angular velocity caused by the engine's inertia. This can be seen by comparing FIG. 3 with FIG. 4. The cylinder with a 60% pressure leak is cylinder number 1 in both cases. The PPC parameter in FIG. 3 takes a negative deviation for cylinder number 1. However, in FIG. 4, it can be seen that the AEP parameter drops substantially below one for cylinder number 2. These two results point to cylinder number 1 as bad.

Figure 5:
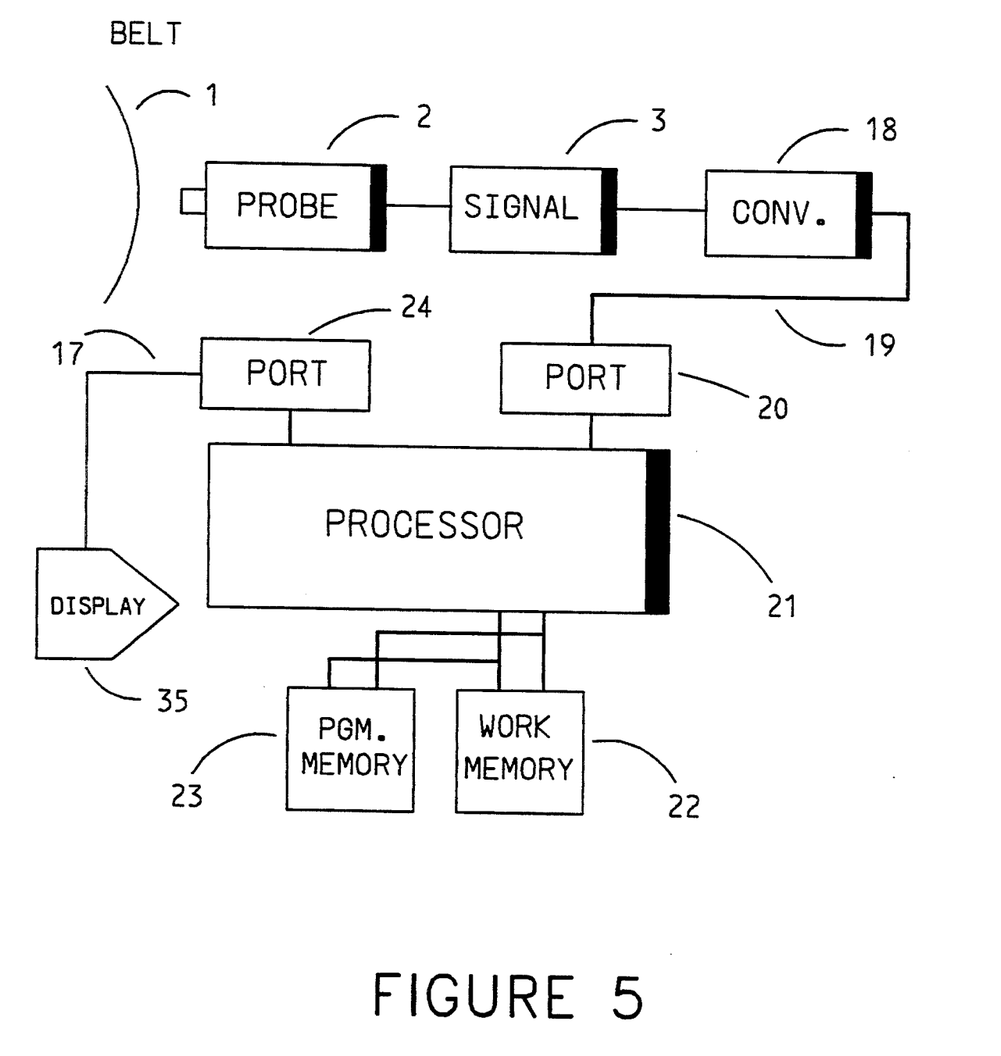
FIG. 5 is a block diagram of one possible way to construct the invention with a digital circuit using a microprocessor to accomplish the computation of the PPC parameter and the AEP parameter.

Referring now to FIG. 5, it can be seen that the invention can be constructed using a microprocessor or digital signal processor (DSP) as a computing means. The signal representing the instantaneous angular velocity is sampled and converted to a sequence of numerical values by the signal converter 18. The signal converter 18 can be an analog to digital converter (A/D) or a digital timer. The resulting sequence of numbers enters the microprocessor 21 via its input port 20. This port can be a latch or standard port device well known in the art. The microprocessor 21 executes a program stored in a program memory 23 and uses a work memory 22 for local storage and computation in a well known manner. The program memory can be a read-only memory (ROM) or a random-access memory (RAM). The work memory is a RAM. Fault indications 17 are outputted via the microprocessor's output port 24 to be displayed on a display device 35, stored, communicated, or brought to the attention of an operator by some other method. The thresholds for the comparison of the PPC and AEP parameters can be stored either in ROM or in RAM. A microprocessor or DSP can perform the various mathematical operations that form part of the invention. For most applications, this is the best mode of practicing the present invention. However, a microprocessor based system is only one of many means of constructing the invention.

Figure 6:
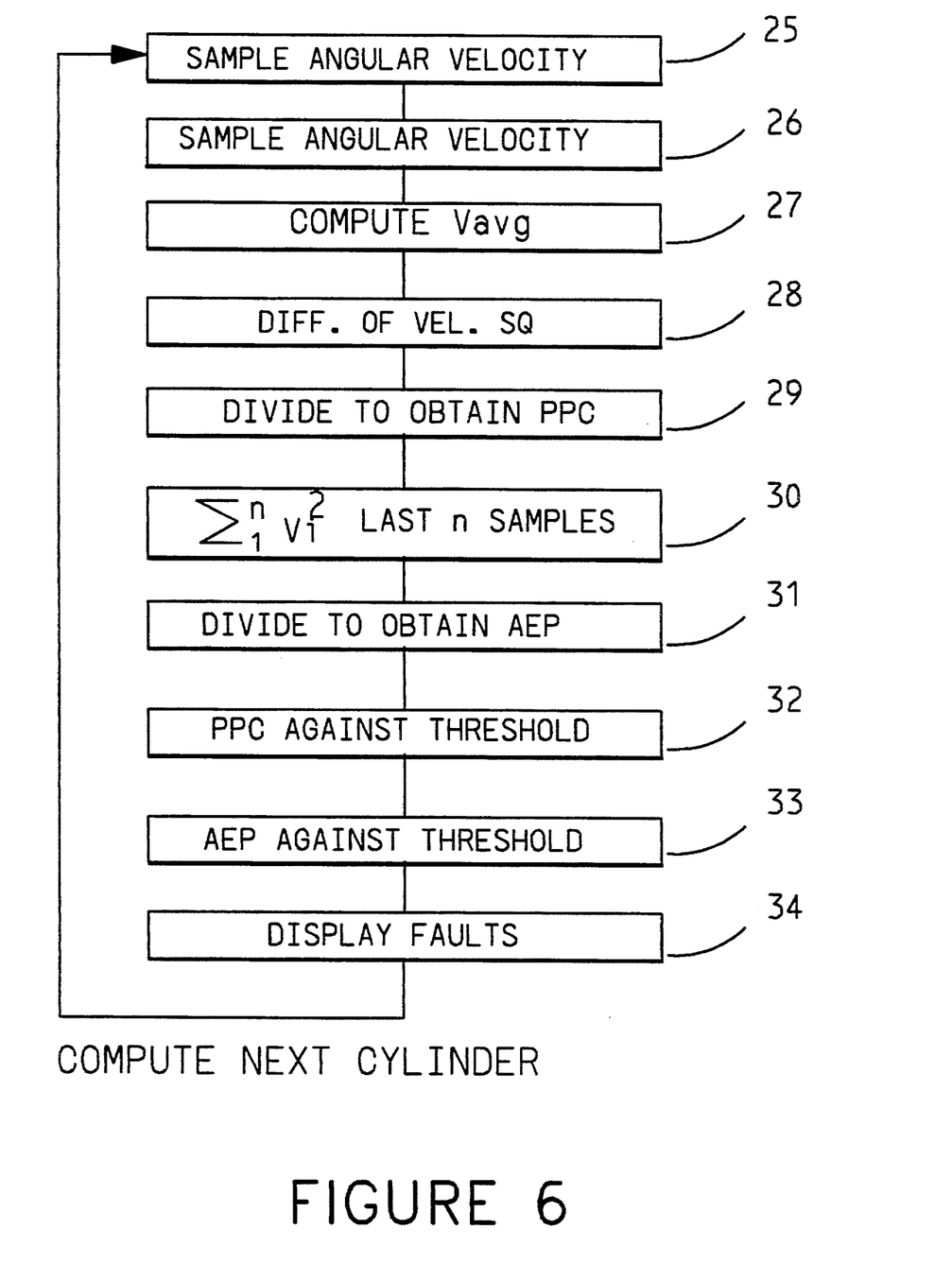
FIG. 6 is a flow chart of the steps necessary to compute the PPC and AEP parameters and compare them against thresholds to determine cylinder performance.

FIG. 6 is a representative flow chart of a microprocessor or DSP stored program that could be used to construct the computational part of the invention. In block 25 and 26 respectively the endpoint angular velocities $V_{start}$ and $V_{end}$ are determined or sampled. In block 27, the average angular velocity $V_{avg}$ is computed and updated each engine cycle. Block 28 subtracts the squares of $V_{end}$ and $V_{start}$, while block 29 divides by the square of $V_{avg}$ to obtain the PPC parameter. Block 30 computes the sum of the squares of the instantaneous angular velocity samples over the cylinder cycle while block 31 divides this sum by the square of $V_{avg}$ to obtain the AEP parameter. Blocks 32 and 33 compare the PPC parameter and the AEP parameter against the thresholds to determine if the cylinder suffered a fault during the previous cycle, while block 34 displays, records, or reports any such faults directly to an operator or to an engine analyzer.

It should be clear to one skilled in the electronic am that the invention can be constructed from analog circuits with devices such as operational amplifiers, integrators, comparators or similar devices using voltage values as variables. Alternatively, the invention can be constructed from discrete digital circuits such as TrL and CMOS integrated circuits as well as MSI and LSI integrated circuits, programmable logic devices such as PLD's, gate arrays, or custom integrated circuits such as ASIC's. The invention can also be constructed using a microprocessor or digital signal processor DSP with associated memories and stored program.

It is to be understood that the above-described arrangements are merely illustrative of the application of the principles of the invention, and that other arrangements may be devised by those skilled in the art without departing from the spirit and scope of the invention.

We claim:

1. An apparatus for diagnosing a faulty cylinder in an internal combustion engine comprising:
   a probe means for producing an electrical signal representative of instantaneous engine angular velocity;
   means for converting said electrical signal to discrete measures of instantaneous angular velocity at N predetermined times during a cylinder period where N is an integer greater than two;
   means for averaging said measures of instantaneous angular velocity to produce an average angular velocity by summing an integer number of said measures of instantaneous angular velocity and dividing that sum by said integer number;
   means for computing a PPC parameter from said measures of intsantaneous angular velocity for each cylinder period by subtracting the square of the measure of instantaneous angular velocity at the beginning of a cylinder cycle from the square of the measure of instantaneous angular velocity at the end of that cylinder period and dividing that difference by the square of the average engine angular velocity;
   means for declaring a possible cylinder fault when said PPC parameter is less than zero.

2. The apparatus of claim 1 further comprising:
   means for computing an AEP parameter by summing the squares of the measure of instantaneous angular velocity over a cylinder period and dividing this by N times the square of the average engine angular velocity;
   means for declaring a possible cylinder fault when said AEP parameter for the next cylinder in a firing sequence is less than one.

3. An apparatus for diagnosing a faulty cylinder in an internal combustion engine, said engine being of the type with cylinder periods and a predetermined firing sequence, each cylinder periods having a beginning and an end, said apparatus comprising:
   probe means for producing an electrical signal representative of instantaneous engine angular velocity;
   a signal converter with digital output coupled to said probe means for producing angular velocity samples at predetermined times, there being N samples per cylinder period, where N is an integer greater than two;
   processor a with stored program for computing an average angular velocity by summing an integer number of instantaneous angular velocity samples to produce a first sum and dividing that first sum by said integer number, computing a difference by substracting the square of the sample at the beginning of a cylinder period from the square of the sample at the end of that cylinder period, dividing said difference by the square of the average angular velocity to produce a PPC parameter, summing the squares of the N angular velocity samples in a cylinder period to produce a second sum, dividing that second sum by N times the square of the average angular velocity to produce and AEP parameter, declaring a possible cylinder fault when the PPC parameter is less than zero, declaring a possible cylinder fault when the AEP parameter is less than one.

4. The apparatus of claim 3 wherein the processor is a microprocessor.

5. The apparatus of claim 3 wherein the processor is a digital signal processor (DSP).

6. The apparatus of claim 3 wherein the program is stored in a read-only memory (ROM).

* * * * *